(12) United States Patent
Hahnlen

(10) Patent No.: US 12,358,242 B2
(45) Date of Patent: Jul. 15, 2025

(54) FUNCTIONAL INTEGRATION OF TRANSITION STRUCTURES INTO FIBER REINFORCED COMPOSITE LAYUPS

(71) Applicant: HONDA MOTOR CO., LTD., Tokyo (JP)

(72) Inventor: Ryan Hahnlen, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 905 days.

(21) Appl. No.: 17/228,318

(22) Filed: Apr. 12, 2021

(65) Prior Publication Data
US 2021/0323252 A1 Oct. 21, 2021

Related U.S. Application Data

(60) Provisional application No. 63/011,951, filed on Apr. 17, 2020.

(51) Int. Cl.
| | |
|---|---|
| *B29C 70/68* | (2006.01) |
| *B29K 307/04* | (2006.01) |
| *B29K 705/00* | (2006.01) |

(52) U.S. Cl.
CPC .......... *B29C 70/68* (2013.01); *B29K 2307/04* (2013.01); *B29K 2705/00* (2013.01)

(58) Field of Classification Search
CPC ....... B29C 70/304; B29C 70/68; B29C 70/76; B29C 70/86; B29C 2307/04; B32B 27/38; B32B 27/00; B32B 27/08; B32B 27/20; B32B 27/30; B32B 27/32; B32B 27/34; B32B 27/36; B32B 27/365; B32B 27/40; B32B 3/08; B32B 2262/106; B29K 2705/00
USPC ...................................................... 428/293.1
See application file for complete search history.

(56) References Cited

U.S. PATENT DOCUMENTS

| | | | |
|---|---|---|---|
| 2016/0016614 A1* | 1/2016 | Conze .................. | B62D 29/004 264/154 |
| 2017/0291253 A1 | 10/2017 | Hahnlen et al. | |
| 2018/0346034 A1* | 12/2018 | Sheldon ............... | B29C 70/304 |

FOREIGN PATENT DOCUMENTS

CN 104918771 A 9/2015

* cited by examiner

*Primary Examiner* — Camie S Thompson
(74) *Attorney, Agent, or Firm* — ArentFox Schiff LLP

(57) ABSTRACT

A method for preparing a multi-material component including providing a fiber reinforced component, the fiber reinforced component having one or more working layers of a fiber reinforced composite material, wherein each of the one or more working layers includes one or more fiber reinforced composite material laminae. The method includes attaching the fiber reinforced component to a multi-material transition component, wherein the multi-material transition component includes a metallic component and a transition laminate includes a transition material, wherein the transition laminate includes one or more partially embedded transition laminae each having a first embedded end that is embedded in the metallic component. Also provided are multi-material transition components and multi-material components provided by the method.

18 Claims, 5 Drawing Sheets

FUNCTIONAL INTEGRATION OF TRANSITION STRUCTURES INTO FIBER REINFORCED COMPOSITE LAYUPS

CROSS-REFERENCE TO RELATED APPLICATION

The present application claims priority to U.S. Provisional Application No. 63/011,951, filed Apr. 17, 2020, entitled "FUNCTIONAL INTEGRATION OF TRANSITION STRUCTURES INTO FIBER REINFORCED COMPOSITE LAYUPS," the contents of which are expressly incorporated herein by reference in their entirety.

TECHNICAL FIELD

The present disclosure is directed to methods of joining fiber reinforced composite materials and metallic materials.

BACKGROUND

Current methods for joining fiber reinforced composite materials and metallic materials generally involve mechanical fasteners and/or adhesives to achieve load transfer between the two joined components. However, such methods are often insufficient in terms of automation, material cost, and/or joint strength. There is thus a need in the art for methods of joining fiber reinforced composite materials and metallic materials that allow for acceptable automation and material cost, and which ensure an acceptable stiffness and strength of the resulting multi-material component.

SUMMARY

The present disclosure is directed to methods of joining fiber reinforced composite materials and metallic materials. According to some aspects, the method may comprise providing a fiber reinforced component, the fiber reinforced component comprising one or more laminae of a fiber reinforced composite material. According to some aspects, at least a portion of the one or more fiber reinforced composite material laminae of the fiber reinforced component may be provided as one or more working layers. The method may comprise attaching the fiber reinforced component to a multi-material transition component. According to some aspects, the multi-material transition component may comprise a metallic component and two or more transition laminae, wherein at least a portion of the transition laminae each comprises a first end that is embedded in the metallic component and a second end that is interleaved with the fiber reinforced component's working layers and/or fiber reinforced composite material laminae. The present disclosure is also directed to a multi-material transition component provided by the methods as described herein and a multi-material component provided by the methods as described herein, wherein the multi-material component comprises a fiber reinforced component attached to a multi-material transition component as described herein.

BRIEF DESCRIPTION OF THE DRAWINGS

FIG. 10 shows an example top view of a multi-material component as described herein.

DETAILED DESCRIPTION

Figure 1A:
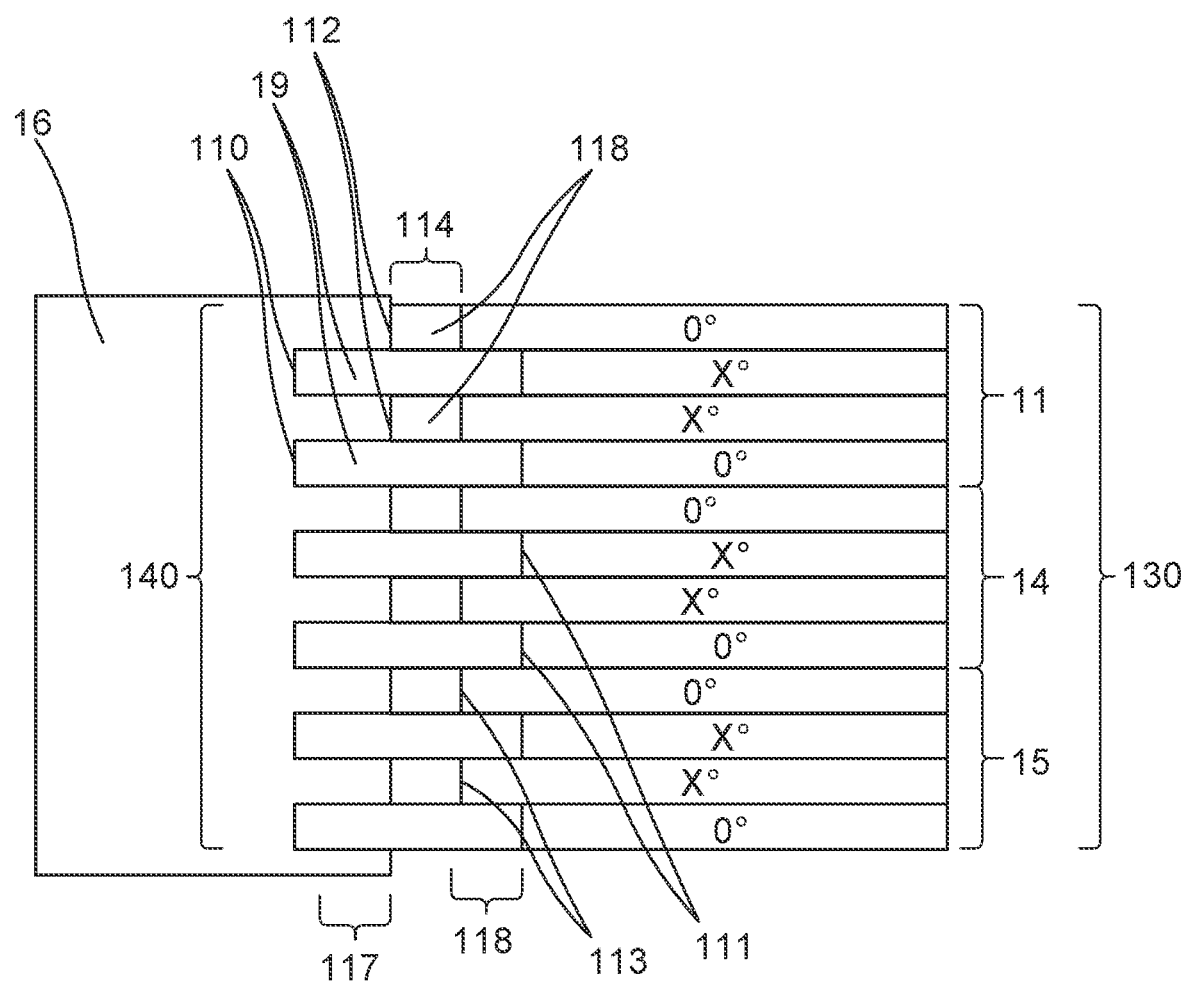
FIG. 1A shows an example side view of a multi-material component as described herein.

The present disclosure is directed to methods of joining fiber reinforced composite materials and metallic materials. According to some aspects, the method may comprise providing a fiber reinforced component, the fiber reinforced component comprising one or more laminae of a fiber reinforced composite material. According to some aspects, at least a portion of the one or more fiber reinforced composite material laminae of the fiber reinforced component may be provided as one or more working layers. The method may comprise attaching the fiber reinforced component to a multi-material transition component. According to some aspects, the multi-material transition component may comprise a metallic component and two or more transition laminae, wherein at least a portion of the transition laminae each comprises a first end that is embedded in the metallic component and a second end that is interleaved with the fiber reinforced component's working layers and/or fiber reinforced composite material laminae. The present disclosure is also directed to a multi-material transition component provided by the method as described herein and a multi-material component provided by the method as described herein, wherein the multi-material component comprises a fiber reinforced component attached to a multi-material transition component as described herein.

According to some aspects, the method may comprise providing a fiber reinforced component, the fiber reinforced component comprising one or more fiber reinforced composite material laminae. Each of the fiber reinforced composite material laminae may individually comprise a fiber reinforced composite material, that is, a composite material having a matrix material and one or more fibers.

According to some aspects, the fiber reinforced composite material may comprise a fiber reinforced polymer ("FRP"). Examples of fibers useful according to the present disclosure include, but are not limited to, glass fibers, carbon fibers, aramid fibers, basalt fibers, synthetic fibers (e.g., a rigid-rod isotropic crystal polymer that is spun by a dry-jet wet spinning process, such as Zylon® fibers), and combinations thereof. According to some aspects, the fibers may comprise "pre-preg" or "pre-impregnated" composite fibers. As used herein, the terms "pre-preg" or "pre-impregnated" composite fibers refer to fibers that have been impregnated with a matrix material prior to curing.

It should be understood that as used herein, "curing" may refer to any curing process known in the art compatible with the present disclosure, including but not limited to, temperature-accelerated curing (e.g., via an autoclave), natural curing over a period of time, and combinations thereof.

Examples of matrix materials useful according to the present disclosure include, but are not limited to, polymer matrix materials such as epoxy polymers, vinylester polymers, polyester thermosetting plastic polymers, thermoplastic polymers, polyamides, polycarbonates, polyethylenes, polypropylenes, polyurethanes, and combinations thereof.

As used herein, the term "lamina" refers to a thin layer of a material. It should be understood that the thickness of each lamina will depend at least in part on the lamina material, for example, the nature of the fiber at least partially forming the lamina, the fiber volume fraction, the laminate construction, and/or the composite manufacturing and/or curing process. Generally, each lamina as described here may independently have a thickness of between about 0.01 mm and 10 mm, optionally between about 0.01 mm and 5 mm, optionally between about 0.01 mm and 2.5 mm, optionally between about 0.5 mm and 2.5 mm, and optionally less than about 0.5 mm, although one or more laminae may have a different thickness depending on the application.

According to some aspects, at least a portion of the one or more fiber reinforced composite material laminae of the fiber reinforced component may be provided as one or more working layers. Each of the one or more working layers may independently comprise two fiber reinforced composite material laminae, optionally three fiber reinforced composite material laminae, optionally four fiber reinforced composite material laminae, and optionally five or more fiber reinforced composite material laminae. Each fiber reinforced composite material lamina comprised by a working layer may be the same as or different from another fiber reinforced composite material lamina comprised by the working layer.

According to some aspects, at least a portion of the fiber reinforced composite material laminae may comprise a unidirectional fabric. As used herein, the term "unidirectional fabric" or "UD fabric" refers to a fiber reinforced composite material as described herein wherein a majority of the fibers (e.g., at least about 90%) extend in one direction.

Additionally or alternatively, according to some aspects, one or more portions of the fiber reinforced composite material laminae may comprise a woven fabric (e.g., a woven fabric having fibers oriented at 0° and 90°), a braided fabric (e.g., QISO® braided fabric), a nonwoven mat, or a combination thereof.

It should be understood that the thickness of each working layer will correspond with the combined thickness of each fiber reinforced composite material lamina comprised thereby. According to some aspects, each working layer may independently have a thickness of between about 0.01 mm and 10 mm, optionally between about 0.01 and 5 mm, optionally between about 0.01 and 3 mm, optionally between about 0.5 and 2.5 mm, optionally between about 1 and 2 mm, and optionally about 1.2 mm.

According to some aspects, one or more of the working layers may be preassembled, that is, assembled prior to being provided according to the method of the present disclosure. For example, two or more fiber reinforced composite material laminae may be stitched together with non-structural thread in order to provide a working layer as described herein. Stitching may be performed by any process known in the art suitable for use with the methods described herein. Examples of materials useful for the stitching include, but are not limited to, polymer yarns and/or fibers compatible with one or more components as described herein, including polyethylene and/or polyester yarns and/or fibers.

Additionally or alternatively, one more fiber reinforced composite material laminae may be arranged in an orientation relative to a multi-material transition component as described herein until the fiber reinforced component and the multi-material transition component are cured to provide a multi-material component as described herein. It should be understood that in this example, the two or more fiber reinforced composite material laminae may comprise pre-preg composite fibers and/or a matrix material configured to fix the one more fiber reinforced composite material laminae in position relative to the multi-material transition component upon curing.

Figure 1B:
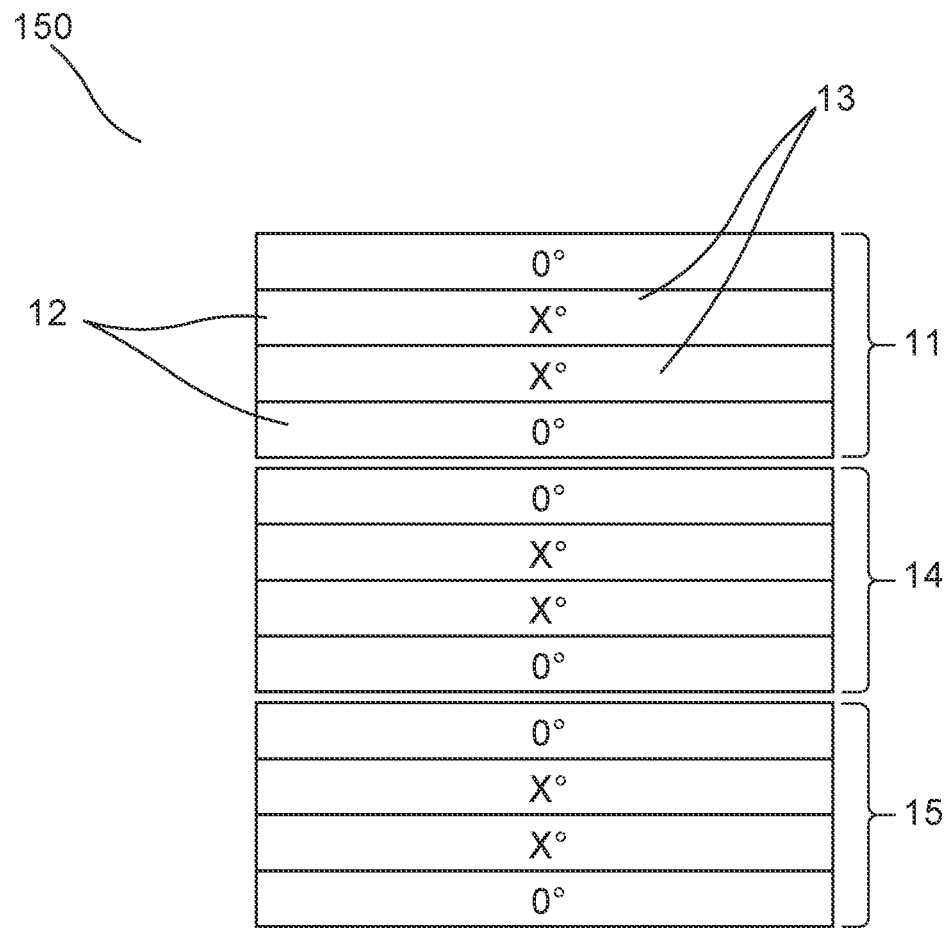
FIG. 1B shows an example side view of a fiber reinforced component as described herein.
Figure 1C:
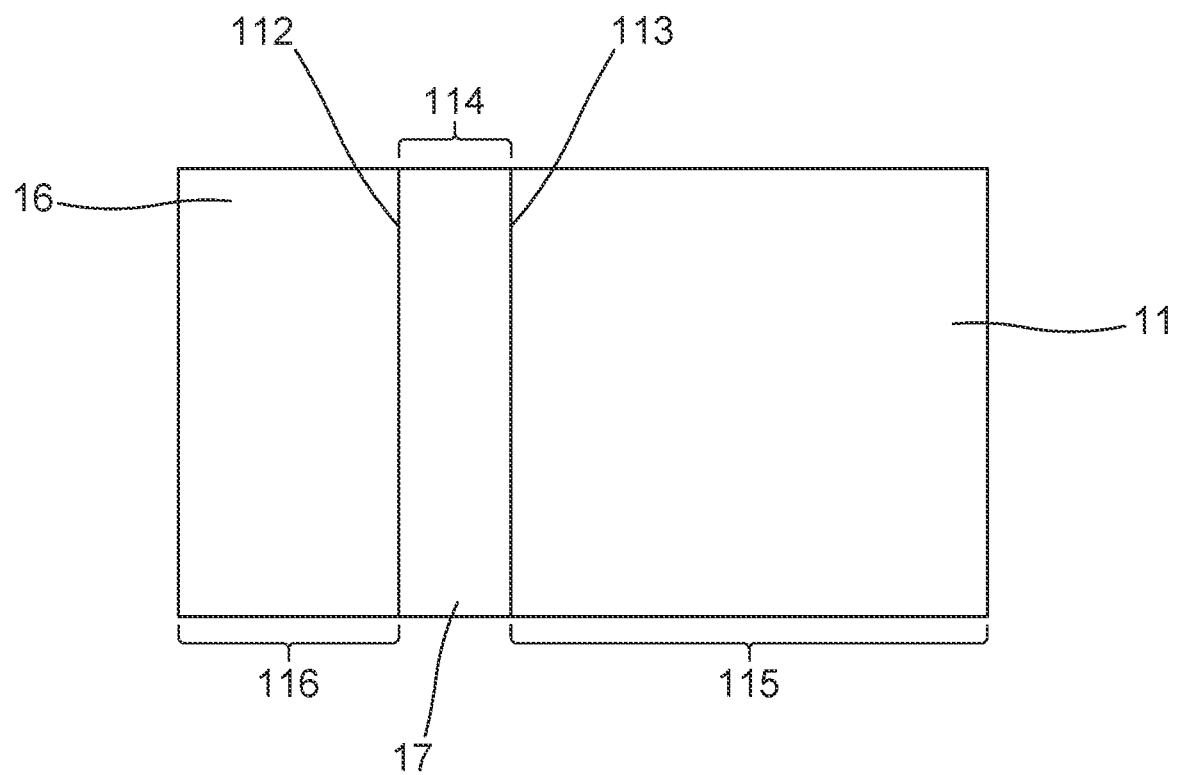
FIG. 1D shows an example of a multi-material transition component as described herein.

FIG. 1B shows an example schematic of a fiber reinforced component as described herein. In particular, FIG. 1B shows a working layer 11 according to aspects of the present disclosure. As shown in FIG. 1B, working layer 11 may comprise fiber reinforced composite material laminae 12, 13. In the example shown in FIG. 1B, fiber reinforced composite material laminae 12 may comprise a first fiber reinforced composite material and fiber reinforced composite material laminae 13 may comprise a second fiber reinforced composite material. It should be understood that in FIGS. 1A and 1B, 0° and X° represent laminae of different orientations. For example, 0° may signify laminae comprising a UD fabric as described herein wherein the fabric of each 0° lamina is oriented along a first reference axis. In this example, X° may signify laminae comprising a UD fabric as described herein wherein the fabric of each X° lamina is oriented along a second reference axis that is different from the first reference axis. In this example, the relationship between the first axis and the second axis may be selected in order to sufficiently accommodate the predicted loading of the multi-material component comprising the fiber reinforced component.

It should be understood that the fiber reinforced component should not be limited to the example shown in FIG. 1B. For example, all of the fiber reinforced composite material laminae 12,13 may comprise the same fiber reinforced composite material and/or the working layer 11 may comprise three or more different fiber reinforced composite materials.

It should also be understood that the example fiber orientations shown in FIGS. 1A and 1B should not be limited to any specific orientation in relation to any component described herein. For example, each 0° lamina does not necessarily require a 0° orientation in relation to any component described herein. In one non-limiting example, each 0° lamina may be oriented along a first reference axis that is 45° in relation to another component as described herein, and each X° lamina may be oriented along a second reference axis that is about −45° in relation to the first reference axis. In another non-limiting example, each 0° lamina may be oriented along a first reference axis that is 0° in relation to another component as described herein, and each X° lamina may be oriented along a second reference axis that is about 90° in relation to the first reference axis. In another non-limiting example, each 0° lamina may be oriented along a first reference axis that is 0° in relation to another component as described herein, and each X° lamina may be oriented along a second reference axis that is about 45° in relation to the first reference axis. In yet another non-limiting example, each 0° lamina may be oriented along a first reference axis that is 0° in relation to another component as described herein, and each X° lamina may be oriented along a second reference axis that is about −45° in relation to the first reference axis.

FIG. 1B also shows a second working layer 14 and a third working layer 15, each of which may independently be the same as or different from working layer 11. It should be understood that the one or more working layers 11, 14, 15 may collectively be referred to herein as the fiber reinforced component 150. According to some aspects, the fiber reinforced component may comprise between 1 and 10 working layers, optionally between 1 and 9 working layers, optionally between 1 and 8 working layers, optionally between 1 and 7 working layers, and optionally between 2 and 6 working layers.

The method of the present disclosure may comprise attaching the fiber reinforced component to a multi-material transition component. The multi-material transition component may comprise a metallic component and two or more transition laminae.

As used herein, the term "metallic component" refers to a component comprising a metallic material. According to some aspects, the metallic material may be any metallic material for use in a vehicle part. As used herein, the term "vehicle" refers to any manned or unmanned structure capable of moving and is powered by any form of energy. The term "vehicle" includes, but is not limited to, cars, trucks, vans, minivans, SUVs, motorcycles, scooters, boats, personal watercraft, submersibles, aircraft, and spacecraft. Metallic materials useful according to the present disclosure include, but are not limited to, metals such as gold (Au), platinum (Pt), titanium (Ti), nickel (Ni), iron (Fe), chromium (Cr), aluminum (Al), magnesium (Mg), and alloys thereof, such as steel (including stainless steel).

The multi-material transition component may further comprise two or more transition laminae. As used herein, the two or more transition laminae may be collectively referred to herein as a transition laminate. According to some aspects, each of the two or more transition laminae may comprise a transition material. The transition material may be any material useful according to the present disclosure, including a fiber reinforced composite material as described herein. The fiber reinforced composite material may be the same as or different from the fiber reinforced composite material comprised by the fiber reinforced component. According to some aspects, the transition material may additionally or alternatively comprise an insulating material. As used herein, the term "insulating material" refers to a material capable of providing galvanic isolation between the metallic component and the fiber reinforced component as described herein. It should be understood that in some instances, a fiber reinforced composite material may be an insulating material. Example insulating materials according to the present disclosure include, but are not limited to, insulating fabrics comprising aramids (e.g., Kevlar®), PBO (e.g., Zylon®), basalt, ultra-high-molecular-weight polyethylenes (e.g., Dyneema® and Spectra®), glass, or a combination thereof, and/or other high-performance natural, synthetic, organic, or inorganic fibers.

As shown in FIG. 1A, at least a portion 19 of the transition laminae 17 (alternatively referred to herein as partially embedded transition laminae 19) may each comprise a first end 110 that is embedded in the metallic component 16.

According to some aspects, the first end 110 of the partially embedded transition laminae 19 may be embedded into the metallic component 16 upon production of the metallic component 16. For example, metallic component 16 may be manufactured using an additive manufacturing process (such as Ultrasonic Additive Manufacturing) and/or computer numerical controlled machining operations such that fibers of the partially embedded transition laminae 19 are encapsulated and/or interlocked with the metallic material of the metallic component 16. In this way, the fibers and metallic material may directly transfer loads, thus providing a more efficient joint. Some non-limiting examples of manufacturing techniques for providing partially embedded transition laminae having a first end embedded in a metallic component are described in U.S. Patent Publication No. 2017/0291253, the disclosure of which is incorporated by reference herein in its entirety.

As shown in FIG. 1A, first ends 110 may have an average length 117 (alternatively referred to herein as embedded length 117) sufficient to provide an acceptable failure mode, such as failure in the metallic material and/or fiber failure.

According to some aspects, embedded length 117 of each embedded transition laminae 19 may independently be between about 1 and 50 mm, optionally between about 1 and 30 mm, and optionally between about 5 and 15 mm. According to some aspects, the average embedded length 117 of embedded transition laminae 19 may be between about 1 and 50 mm, optionally between about 1 and 30 mm, and optionally between about 5 and 15 mm.

According to some aspects, embedded length 117 of each embedded transition laminae 19 may independently be about 5 mm, optionally about 6 mm, optionally about 7 mm, optionally about 8 mm, optionally about 9 mm, optionally about 10 mm, optionally about 11 mm, optionally about 12 mm, optionally about 13 mm, optionally about 14 mm, optionally about 15 mm, optionally about 16 mm, optionally about 17 mm, optionally about 18 mm, optionally about 19 mm, optionally about 20 mm, optionally about 21 mm, optionally about 22 mm, optionally about 23 mm, optionally about 24 mm, and optionally about 25 mm. According to some aspects, the average embedded length 117 of embedded transition laminae 19 may be about 5 mm, optionally about 6 mm, optionally about 7 mm, optionally about 8 mm, optionally about 9 mm, optionally about 10 mm, optionally about 11 mm, optionally about 12 mm, optionally about 13 mm, optionally about 14 mm, optionally about 15 mm, optionally about 16 mm, optionally about 17 mm, optionally about 18 mm, optionally about 19 mm, optionally about 20 mm, optionally about 21 mm, optionally about 22 mm, optionally about 23 mm, optionally about 24 mm, and optionally about 25 mm.

As shown in FIG. 1A, each of the partially embedded transition laminae 19 having a first end embedded 110 in the metallic component 16 may each have a second end 111 that is interleaved with laminae of the one or more working layers 11, 14, 15, as described herein. Interleaved second ends 111 may be interleaved with laminae within working layers 11, 14, 15 and/or with laminae of separate working layers 11, 14, 15. It should be understood that while the example shown in FIG. 1A comprises embedded transition laminae 19 having interleaved second ends 111, the invention should not be limited as such. For example, the transition laminate 17 may comprise a first portion of partially embedded transition laminae 19 and a second portion of laminae each having interleaved second ends 111, wherein the first portion is different from the second portion.

According to some aspects, the method may comprise providing transition laminae interleaved with laminae within working layers 11, 14, 15 and/or with laminae of separate working layers 11, 14, 15 prior to curing. The method may further comprise co-curing the transition laminate 17 and working layers 11, 14, 15 of the fiber reinforced component such that the matrix material comprised by the interleaved second ends 111 and/or laminae within working layers 11, 14, 15 may fix the transition laminate 17 and working layers 11, 14, 15 in position relative to each other, thereby fixing the multi-material transition component and the fiber reinforced component in position relative to each other to form the multi-material component as described herein.

As shown in FIG. 1A, the interleaved second ends 111 may have an average length 118 (alternatively referred to herein as interleaved length 118) sufficient to provide an acceptable strength. According to some aspects, interleaved length 118 may depend at least in part on the critical fiber length corresponding to the fiber reinforced composite material comprise by the transition laminate 17 and/or working layers 11, 14, 15. It should be understood that the critical fiber length is based on the shear strength of the fiber/matrix bond and tensile strength of the fiber. As interleaved length 118 increases, the shear area becomes proportionally larger requiring a proportionally larger force to overcome the shear strength of the matrix/fiber interface. At the critical length, the force required to overcome the interfacial shear strength is equal to the force required to fail the fiber in tension. According to some aspects, average interleaved length 118 is greater than the lesser of the critical fiber length characteristic of the fibers and matrix material comprised by the transition laminate 17 and/or by working layers 11, 14, 15. Additionally or alternatively, average interleaved length 118 is greater than the determined critical fiber length required to ensure fiber failure rather than interlaminar (shear) failure.

According to some aspects, the interleaved length 118 of each interleaved lamina of the transition laminate 17 may independently be between about 2 mm and 3 cm. For example, the interleaved length 118 of each interleaved lamina of the transition laminate 17 may independently be about 2 mm, optionally about 3 mm, optionally about 4 mm, optionally about 5 mm, optionally about 6 mm, optionally about 7 mm, optionally about 8 mm, optionally about 9 mm, and optionally about 10 mm. According to some aspects, the interleaved length 118 of each interleaved lamina of the transition laminate 17 may independently be between about 1 and 3 cm, optionally between about 2 and 3 cm, and optionally between about 1 and 2 cm. According to some aspects, the interleaved length 118 of each interleaved lamina of the transition laminate 17 may independently be at least 1 cm, optionally at least 2 cm, and optionally at least 3 cm.

It should be understood that the average embedded length 117 and/or interleaved length 118 (as shown in FIG. 1A) may provide an acceptable stiffness. For example, embedded length 117 and/or interleaved length 118 may influence local stiffness, that is, the stiffness of the multi-material component in immediate proximity of the embedded portion and/or interleaved portion of the transition laminate 17, respectively.

The transition laminate 17 may also comprise a portion of non-embedded transition laminae 18 (alternatively referred to herein as non-embedded transition laminae 18). One or more non-embedded transition laminae 18 may be positioned above, below, or in between partially embedded transition laminae 19, or any combination thereof. As shown in FIG. 1A, non-embedded transition laminae 18 may each have a first end 112 that abuts metallic component 16. According to some aspects, non-embedded transition laminae 18 may each have a second end 113 that abuts laminae of the one or more working layers 11, 14, 15. However, it should be understood that according to some aspects, a portion or all of non-embedded transition laminae 18 may have interleaved second ends as described herein.

According to some aspects, the method may comprise providing non-embedded transition laminae 18 between at least a portion of individual embedded transition laminae 19 such that the thickness 140 of transition laminate 17 is about equal to the thickness 130 of the fiber reinforced component, as shown in FIG. 1A.

As shown in FIG. 1A, a portion of transition laminae 17, such as non-embedded transition laminae 18, may have an average length 114 (alternatively referred to herein as distancing length 114) corresponding to the distance provided between at least a portion of the working layers 11, 14, 15 and the metallic component 16. It should be understood that distancing length 114 will correspond to approximately the distance between at least one of the first ends 112 that abut metallic component 16 and at least one of the second ends 113 that abut laminae of the one or more working layers 11, 14, 15.

According to some aspects, the average distancing length 114 may be sufficient to provide acceptable handling. For example, the average distancing length 114 may be sufficient to enable automation and/or for a worker to handle and/or interleave portions of the partially embedded transition laminae.

According to some aspects, the average distancing length 114 may be sufficient to provide an acceptable stiffness. In one non-limiting example wherein the fiber reinforced component comprises a carbon fiber reinforced polymer (CFRP), i.e., an FRP comprising carbon fibers, its specific modulus (i.e., elastic modulus divided by density) may be higher than the specific modulus obtainable by the metallic component and/or partially embedded transition laminae 19. In this example, partially embedded transition laminae 19 may have a low specific stiffness. However, when the average distancing length 114 is less than a length 115 of at least one of the one or more working layers 11, 14, 15 of the fiber reinforced component (for example, as shown in FIG. 10), transition laminae 17 may provide a larger system stiffness than the fiber reinforced component due to the fiber reinforced component's greater length.

According to some aspects, the average distancing length 114 may be sufficient to provide acceptable galvanic isolation between the metallic component and the fiber reinforced component, and in particular, the average distancing length 114 may be sufficient to provide galvanic insulation from electrolyte bridging. In one example, the average distancing length 114 may reduce and/or eliminate the likelihood of electrolyte bridging between the metallic component and the fiber reinforced component. For example, a droplet or continuous body of fluid that connects the metallic component and the fiber reinforced component may act as both an ion transport medium and a path of electrical continuity, negating the protection provided by the partially embedded transition component. The average distancing length 114 may be sufficient to reduce and/or eliminate this effect.

It should be understood that according to some aspects, if the modulus of the fibers comprised by transition laminate 17 is lower than that of working layers 11, 14, 15, the average distancing length 114 may be minimized if a higher stiffness is desirable. According to some aspects, the average distancing length 114 may be between about 1 and 10 mm, optionally between about 1 and 5 mm. According to some aspects, the average distancing length 114 may be about 1 mm, optionally about 2 mm, optionally about 3 mm, optionally about 4 mm, optionally about 5 mm, optionally about 6 mm, optionally about 7 mm, optionally about 8 mm, optionally about 9 mm, and optionally about 10 mm.

Figure 1D:
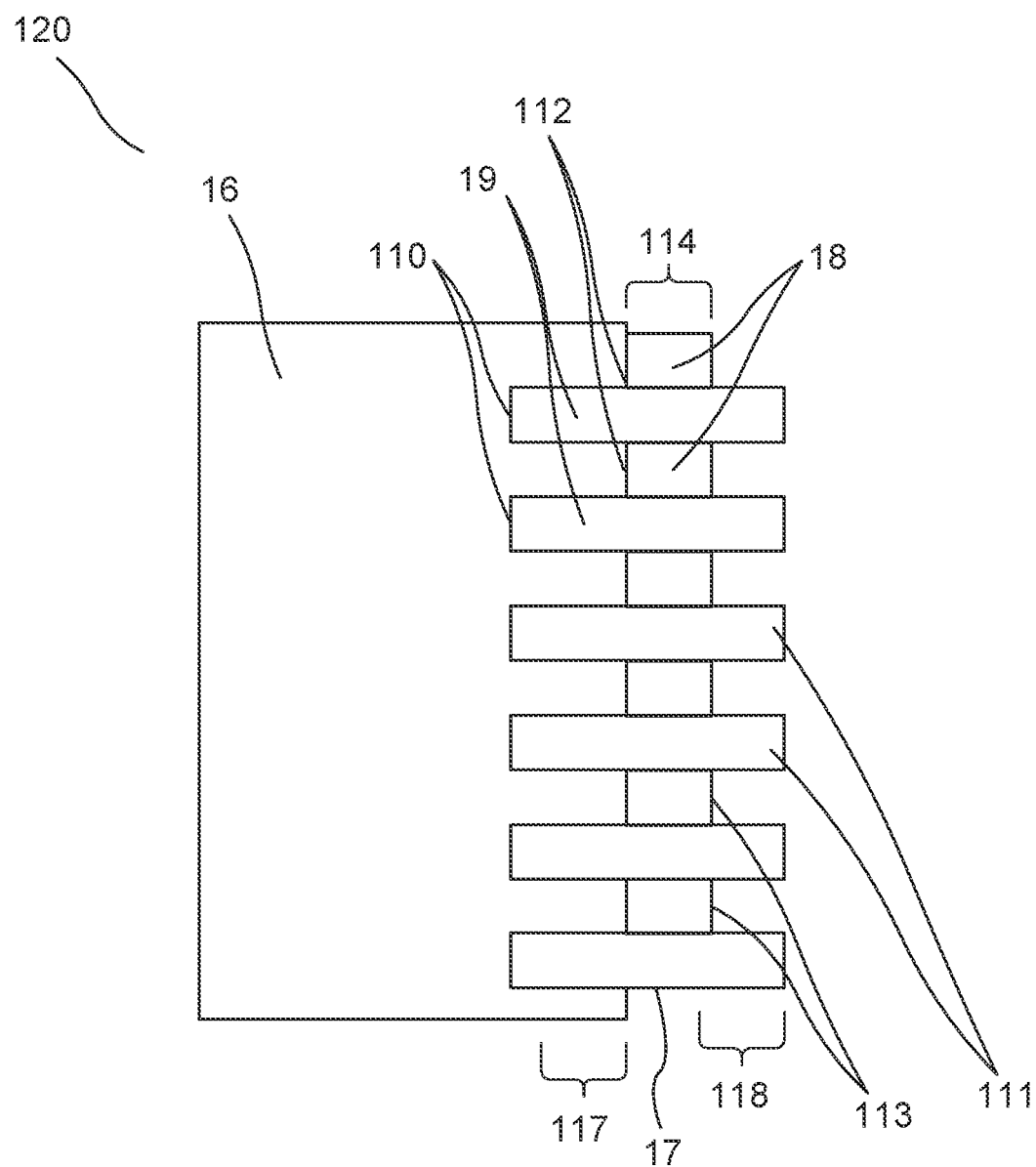

The present disclosure is directed to a multi-material transition component provided by the method as described herein. For example, FIG. 1D shows an example of a multi-material transition component 120 according to the present disclosure. It should be understood that multi-material transition component 120 of FIG. 1D may be attached to working layers 11, 14, 15 as described herein and as shown, for example, in FIG. 1A to provide a multi-material component as described herein.

FIG. 10 shows an example top view perspective of the multi-material component shown in FIG. 1A, including the transition laminate 17 having an average distancing length 114 corresponding to approximately the distance between first end 112, which abuts metallic component 16, and second end 113, which abuts at least one lamina of the one or more working layers 11.

As shown in FIG. 10, the metallic component 16 may have a first length 116 extending in the same direction as distancing length 114 of transition laminate 17. The first length 116 of the metallic component 16 may provide an acceptable stiffness as described herein. For example, the metallic component 16 may have a low specific stiffness. However, when the metallic component 16 has a first length 116 that is less than a length 115 of at least one of the one or more working layers 11, 14, 15 of the fiber reinforced component (for example, as shown in FIG. 10), the metallic component may provide a larger system stiffness than the fiber reinforced component due to the fiber reinforced component's greater length.

According to some aspects, the first length 116 of the metallic component 16 may be based at least in part on the length required for a resistance spot weld, embedded length 117, and the buffer space required to prevent the heat affected zone of the spot weld from damaging the embedded fiber or matrix material. It should be understood that these requirements may depend, at least in part, on the metallic material comprised by the metallic component and on the welding process. In one non-limiting example, the metallic component may comprise aluminum, and the first length 116 may be between about 20 and 30 mm, optionally about 25 mm. In another non-limiting example, the metallic component may comprise steel, and the first length 116 may be between about 10 and 20 mm, optionally about 15 mm. In some non-limiting examples, the first length 116 may be less when laser welding processes are utilized. In one non-limiting example, the metallic component may comprise aluminum, a laser welding process may be utilized, and the first length 116 may be between about 10 and 20 mm, optionally about 15 mm. In another non-limiting example, the metallic component may comprise steel, a laser welding process may be utilized, and the first length 116 may be between about 5 and 15 mm, optionally about 10 mm.

According to some aspects, the first length 116 of the metallic component 16 may be between about 1 and 50 mm, optionally between about 10 and 40 mm, optionally between about 10 and 30 mm, optionally between about 10 and 20 mm, and optionally between about 20 and 30 mm. According to some aspects, the first length 116 of the metallic component 16 may be about 10 mm, optionally about 11 mm, optionally about 12 mm, optionally about 13 mm, optionally about 14 mm, optionally about 15 mm, optionally about 16 mm, optionally about 17 mm, optionally about 18 mm, optionally about 19 mm, optionally about 20 mm, optionally about 21 mm, optionally about 22 mm, optionally about 23 mm, optionally about 24 mm, optionally about 25 mm, optionally about 26 mm, optionally about 27 mm, optionally about 28 mm, optionally about 29 mm, and optionally about 30 mm.

According to some aspects, the ratio of the first length 116 of the metallic component 16 to the length 115 of at least one of the one or more working layers 11, 14, 15 of the fiber reinforced component 150 may be equal to the ratio of the modulus of the metallic component 16 to the modulus of the fiber reinforced component 150, assuming thickness and widths are equal for all components.

Figure 2:
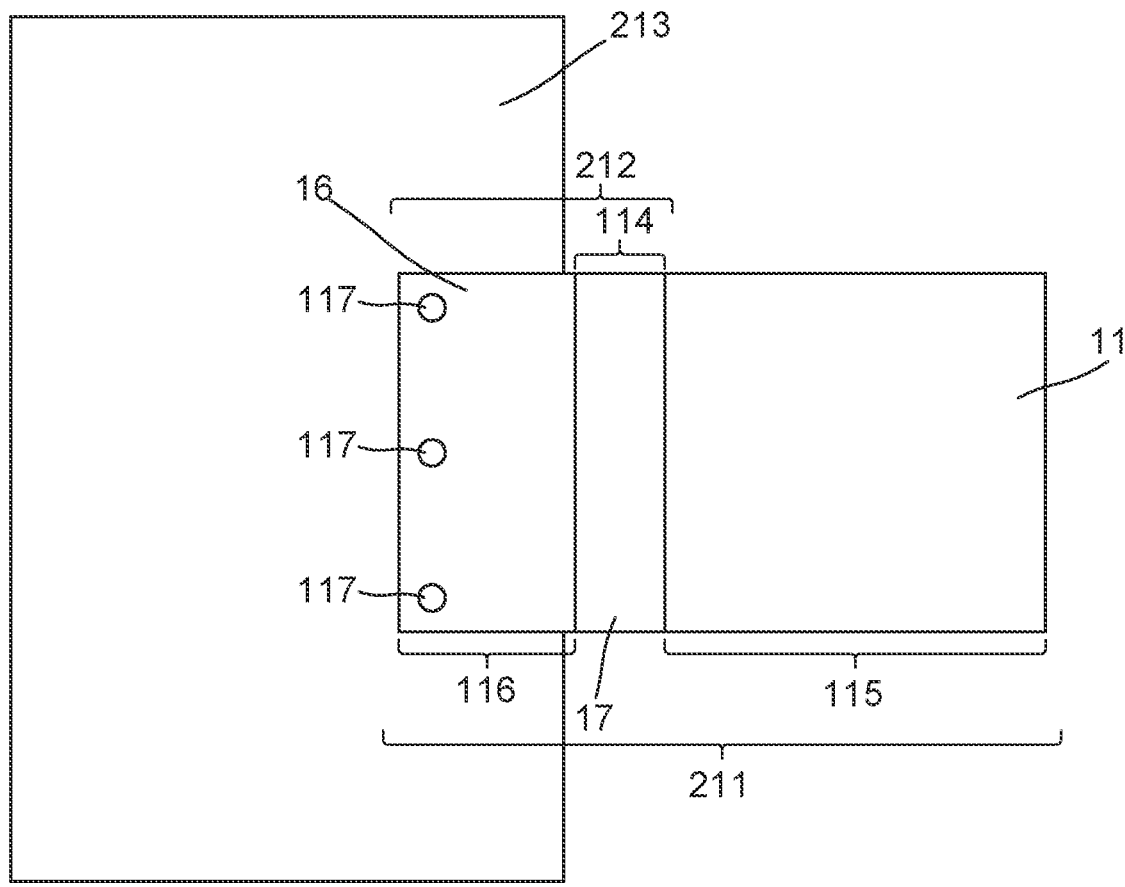
FIG. 2 shows an example top view of a multi-material component joined to a metallic component via discrete metal-metal joints as described herein.

FIG. 2 shows another example top view perspective of the multi-material component shown in FIG. 1A. In particular, FIG. 2 shows a multi-material component 211 comprising one or more working layers 11 of a fiber reinforced component and a multi-material transition component 212, wherein the multi-material transition component 212 comprises metallic component 16 and transition laminate 17, as described herein.

The present disclosure is also directed to a multi-material component comprising the multi-material component as described herein and a second metallic component, wherein the second metallic component is fixed to the metallic component of the multi-material transition component via one or more discrete metal-metal joints. For example, FIG. 2 shows discrete metal-metal joints 117 provided in communication with the metallic component 16 of the multi-material transition component 212 and metallic component 213, which together form a multi-material component. Discrete metal-metal joints 117 may include, for example, any discrete metal-metal joint used in the production of a vehicle as described herein. According to some aspects, the discrete metal-metal joints may optionally be provided with an adhesive.

It should be understood that the discrete metal-metal joints 117 may have a lower stiffness than the one or more working layers 11, 14, 15 of the fiber reinforced component due at least in part to their discrete nature. However, by providing a metallic component 16 and transition laminate 17 having a stiffness that is greater than the stiffness of the discrete joints 117, the multi-material component as a whole may not suffer a stiffness reduction.

It should be understood that if the discrete metal-metal joints 117 are combined with an adhesive, stiffness of the joints may increase. This higher stiffness may be the minimum threshold for the stiffness of the transition laminate 17 so as to not create a more compliant system.

The present disclosure is also directed to multi-material components provided by the methods as described herein. According to some aspects, the multi-material component may comprise a fiber reinforced component attached to a multi-material transition component, as described herein. The multi-material transition component may comprise a transition laminate as described herein having a first portion of transition laminae each having a first end embedded in a metallic component, alternatively referred to herein as embedded transition laminae. According to some aspects, the embedded transition laminae may each have a second end that is interleaved with laminae of one or more working layers comprised by the fiber reinforced component, as described herein. In one example, the fiber reinforced component may comprise a CFRP and/or the transition laminate may comprise an insulating material as described herein. According to some aspects, the multi-material component may further comprise one or more discrete metal-metal joints as described herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A method for preparing a multi-material component, the method comprising:
   providing a fiber reinforced component, the fiber reinforced component comprising one or more working layers of a fiber reinforced composite material, wherein each of the one or more working layers comprises one or more fiber reinforced composite material laminae; and
   attaching the fiber reinforced component to a multi-material transition component, wherein the multi-material transition component comprises:
      a metallic component, and
      a transition laminate comprising a transition material,
   wherein the transition laminate comprises one or more partially embedded transition laminae each comprising a first embedded end that is embedded in the metallic component,
   wherein the transition laminate further comprises one or more non-embedded transition laminae, and
   wherein the one or more non-embedded transition laminae have an average length sufficient to provide galvanic insulation from electrolyte bridging between the metallic component and the fiber reinforced component.

2. The method according to claim 1, wherein the one or more partially embedded transition laminae each comprises a second interleaved end that is interleaved with the fiber reinforced composite material laminae.

3. The method according to claim 1, wherein the fiber reinforced composite material comprises a fiber reinforced polymer.

4. The method according to claim 3, wherein the fiber reinforced polymer comprises carbon fibers.

5. The method according to claim 1, wherein the transition material comprises an insulating material.

6. The method according to claim 1, wherein an average length of the first embedded ends is between about 5 and 15 mm.

7. The method of claim 1, wherein the average length of the one or more non-embedded transition laminae is between about 1 and 10 mm.

8. The method of claim 1, wherein each of the one or more working layers comprises two or more fiber reinforced composite material laminae, and
   wherein attaching the fiber reinforced component to the multi-material transition component comprises:
   interleaving second ends of the one or more partially embedded transition laminae with the fiber reinforced composite material laminae;
   co-curing the fiber reinforced component and the multi-material transition component.

9. The method of claim 8, wherein the one or more partially embedded transition laminae comprises a first matrix material and the fiber reinforced composite material laminae comprises a second matrix material, and
   wherein co-curing fixes the fiber reinforced component relative to the multi-material transition component via at least one of the first matrix material and the second matrix material.

10. A multi-material component comprising:
    a fiber reinforced component, the fiber reinforced component comprising one or more working layers of a fiber reinforced composite material, wherein each of the one or more working layers comprises one or more fiber reinforced composite material laminae; and
    a multi-material transition component, wherein the multi-material transition component comprises:
       a metallic component, and
       a transition laminate comprising a transition material,
    wherein the transition laminate comprises one or more partially embedded transition laminae each comprising a first embedded end that is embedded in the metallic component,
    wherein the transition laminate further comprises one or more non-embedded transition laminae, and
    wherein the one or more non-embedded transition laminae have an average length sufficient to provide galvanic insulation from electrolyte bridging between the metallic component and the fiber reinforced component.

11. The multi-material component according to claim 10, wherein the one or more partially embedded transition laminae each comprises a second interleaved end that is interleaved with the fiber reinforced composite material laminae.

12. The multi-material component according to claim 10, wherein the fiber reinforced composite material comprises a fiber reinforced polymer.

13. The multi-material component according to claim 12, wherein the fiber reinforced polymer comprises carbon fibers.

14. The multi-material component according to claim 10, wherein the transition material comprises an insulating material.

15. The multi-material component according to claim 10, wherein an average length of the first embedded ends is between about 5 and 15 mm.

16. The multi-material component according to claim 10, wherein the average length of the one or more non-embedded transition laminae is between about 1 and 10 mm.

17. A multi-material component comprising:
    the multi-material component according to claim 10; and
    a second metallic component, wherein the second metallic component is fixed to the metallic component of the multi-material transition component via one or more discrete metal-metal joints.

18. The multi-material component according to claim 17, wherein the one or more discrete metal-metal joints are provided with an adhesive.

* * * * *